United States Patent [19]

Lindenbauer

[11] 4,335,707
[45] Jun. 22, 1982

[54] SOLAR ENERGY COLLECTOR AND ENERGY STORAGE CELL

[76] Inventor: Leo K. Lindenbauer, Box 1372, Wickenburg, Ariz. 85358

[21] Appl. No.: 202,595

[22] Filed: Oct. 31, 1980

[51] Int. Cl.³ .............................................. F24J 3/02
[52] U.S. Cl. .................................... 126/440; 126/424
[58] Field of Search ............. 126/438, 439, 424, 440, 126/451, 436, 442

[56] References Cited

U.S. PATENT DOCUMENTS

| | | | |
|---|---|---|---|
| 1,220,091 | 3/1917 | Goff | 126/424 |
| 3,155,849 | 11/1964 | Haring et al. | 126/451 |
| 3,822,692 | 7/1974 | Demarest | 126/271 |
| 4,000,734 | 1/1977 | Matlock et al. | 126/271 |
| 4,066,062 | 1/1978 | Houston | 126/424 |
| 4,203,426 | 5/1980 | Matlock et al. | 126/425 |
| 4,258,698 | 3/1981 | Sales | 126/440 |

Primary Examiner—James C. Yeung
Attorney, Agent, or Firm—Warren F. B. Lindsley

[57] ABSTRACT

An improved sun-tracking solar energy collector in constant focal communication with the rays of the sun during daylight hours and in which the moving element is made compact and inexpensive by incorporating therein only the function of receiving and redirecting the rays of the sun.

10 Claims, 6 Drawing Figures

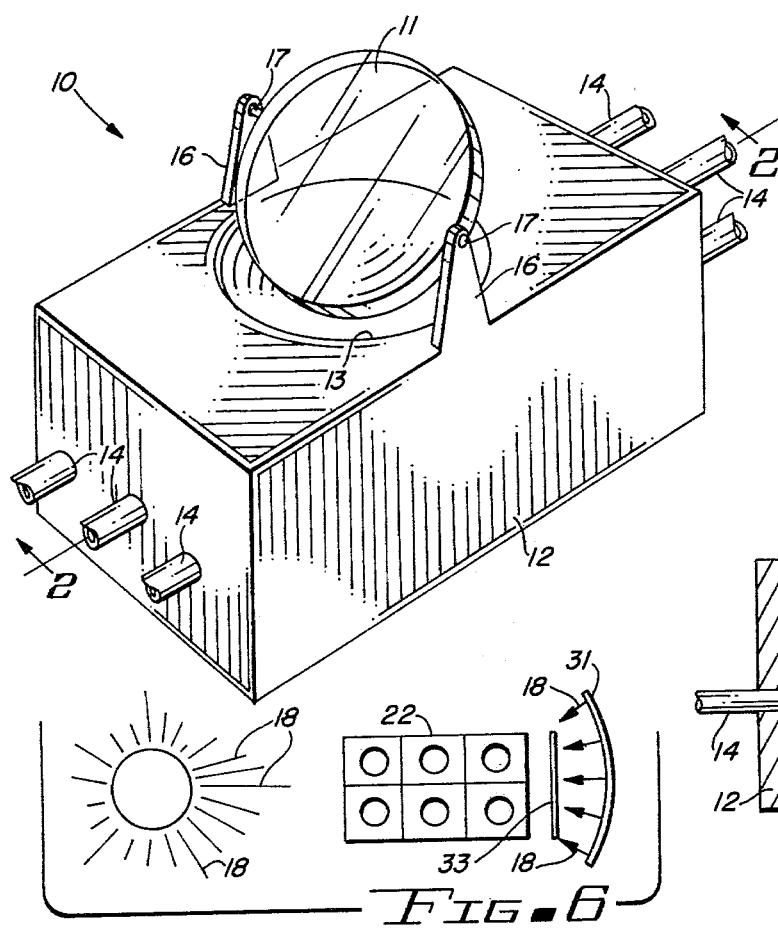
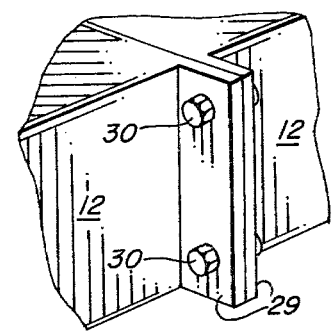
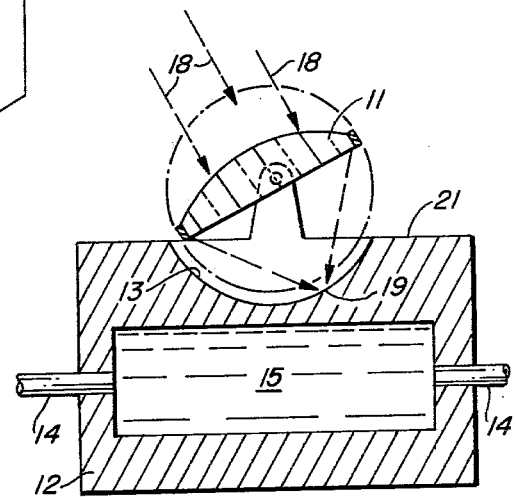
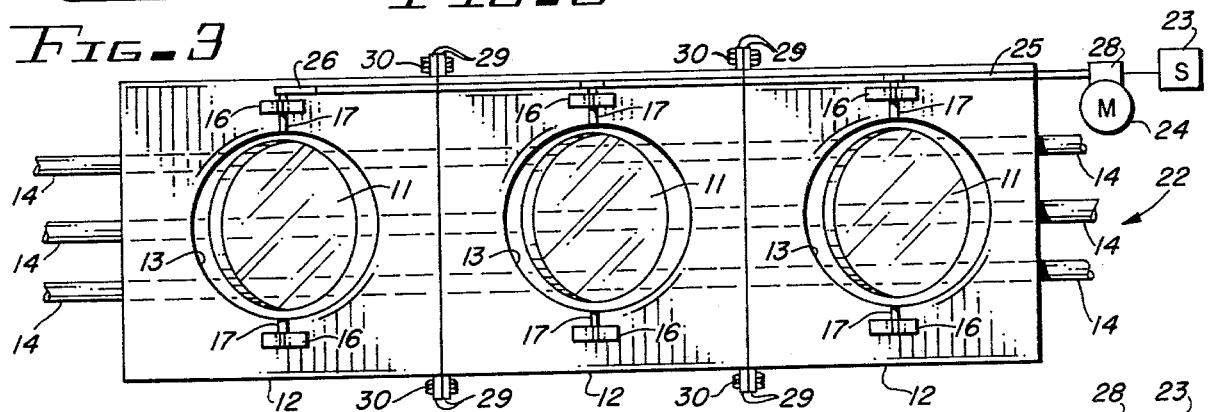
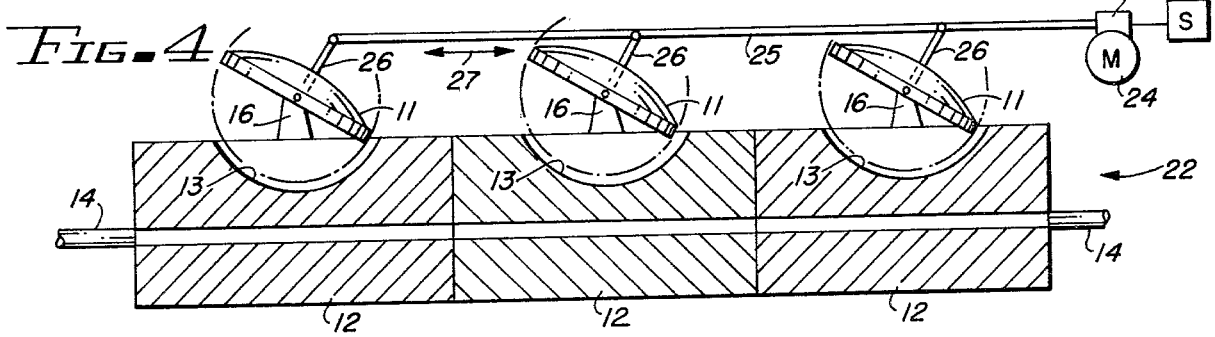

SOLAR ENERGY COLLECTOR AND ENERGY STORAGE CELL

BACKGROUND OF THE INVENTION

The rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

In the face of these growing demands and limited resources, there is one source of energy which is readily available to every country in the world in virtually unlimited quantities. This virtually untapped source is solar energy.

The interest in this almost boundless resource and in its development and harnessing for use in homes and factories is rising as other resources dwindle. Its desirability is further enhanced by the fact that solar energy may be converted to practical use without the hazard of environmental contamination.

DESCRIPTION OF THE PRIOR ART

Until recently, the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

Once such device known as a flat plate collector is made of metal and glass with one or more layers of glass laid over a blackened metal plate. Air spaces are provided between the layers of glass and air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day, its surface is not perpendicular to the rays of the sun.

A second disadvantage is that the flat plate collector does not permit the concentration of solar energy at a localized point as needed for the most effective heating of the water and the conversion of water to steam such as required in certain solar-to-electrical conversion processes.

Parabolic reflectors have been utilized in the past along with sun tracking mechanisms in connection with various schemes for the collection, conversion and utilization of solar energy. Such equipment is described in U.S. Pat. Nos. 4,000,734 and 4,203,426.

At best, the prior art heat exchangers have been extremely inefficient even to the point where it is necessary to incorporate thereinto an elaborate system of gears and racks or other means to shift or otherwise change the positions of the exchange or collector unit so that its relative position to the source of heat will remain constant.

In the typical sun-tracking solar collector, the moving collector has incorporated therein the energy storage elements, such as water pipes. A flexible or a rotating coupling is therefore required to carry the water or other energy storage medium from the moving collector assembly to a stationary energy conversion or utilization system. Such flexible or rotating couplings add cost and complexity to the system and introduce a potential for operating malfunctions and equipment failures. The incorporation of the storage elements in the tracking assembly also adds weight and bulk to the assembly. These factors adversely affect equipment cost to an even greater degree.

U.S. Pat. No. 3,822,692 also discloses the use of lens for directing the solar energy to tubes involved in a closed fluid flow circuit with a pressure sensing unit provided for operating a shade to cover the lens under predetermined conditions.

Further improvements in solar collectors, however, are needed. There is, in particular, an urgent need for a suntracking collector that during daylight hours is in constant focal communication with the sun and is formed from a basic building unit which may be multiplied in number and assembled into an array to meet the energy needs of a particular job to which it is applied.

SUMMARY OF THE INVENTION

In accordance with the invention claimed, an improved sun tracking solar energy collector is provided which is in constant focal communication with the sun during daylight hours when the sun is shining and is compact and inexpensive by virtue of the elimination of all energy storage elements from the moving mechanism.

It is, therefore, one object of the present invention to provide an improved sun-tracking solar energy collector.

Another object of this invention is to provide a sun tracking solar collector in which the bulk and weight of the moving element are reduced to a minimum.

A further object of this invention is to provide a sun-tracking solar collector in which the moving element has the sole function of capturing and redirecting the rays of the sun, all other functions being served by equipment mounted on a stationary platform.

A still further object of this invention is to provide a sun-tracking solar collector in a form requiring no flexible or rotating couplings for the transfer of a storage medium between the moving platform and associated stationary equipment.

A still further object of this invention is to provide a sun-tracking solar collector which is in constant communication with the sun's rays and by virtue of its basic cell configuration can be built up in any size array to fit the energy needs of the job to which it is to be applied.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of an improved sun-tracking solar collector cell embodying the invention;

FIG. 2 is a cross-sectional view of the collector cell of FIG. 1 as seen along line 2—2 thereof;

FIG. 3 is a top view of a collector array comprising a number of cells of the type shown in FIGS. 1 and 2 connected together to utilize a common tracking mechanism and a common water circulation system;

FIG. 4 is a side view of the collector array of FIG. 3;

FIG. 5 illustrates an optional mechanical feature that may be incorporated in the cell structure to facilitate the coupling of cells together to form an array; and FIG. 6 illustrates the optional use of a concentrating mirror and a flat plate mirror in conjunction with the collector cell or array of the invention.

DESCRIPTION OF THE PREFERRED EMBODIMENT

Referring more particularly to the drawing by characters of reference, FIGS. 1 and 2 disclose an improved sun-tracking solar collector cell 10 comprising a sun-tracking lens 11 pivotally supported over an energy storage cell 12.

Lens 11 is preferably a double convex lens which has the characteristic of receiving parallel rays of light and concentrating them at its focal point but may be any other form of lens structure and still fall within the scope of this invention.

The storage cell 12 has the overall form of a cube or a rectangular block which preferably is formed from a solid block of copper, aluminum or other thermally conductive metal. Because it is desirable to mount the circular lens 11 in as close proximity as possible to cell 12, an identation or depression 13 is formed in the top surface of cell 12. This depression is preferably one having a spherical contour that will provide clearance for lens 11 as it is tilted about its mounting axis.

Also incorporated in the cell are passageways for water or another medium for collecting heat from cell 12 and carrying the heat to an energy conversion system or to the point of use. The passageways may comprise one or more pipes 14 that pass unidirectionally through openings in the cell or they may comprise cylindrical openings in the cell formed when the blocks are cast or they may be formed by subsequent drilling or machining. Enlarged openings or chambers 15 may be provided, if desired, in the interior of cell 12 to increase the capacity provided for the medium.

Lens mounting supports 16 are provided for the pivotal mounting of lens 11 and are located at opposite sides of depression 13 rising vertically from the top surface of cell 12. Pivot pins 17 extending outwardly along a common diameter of lens 11 pass through horizontally aligned holes in supports 16. The lens may be rotated about this pivotal support to be directed toward the sun and to follow the sun as it moves across the sky.

As shown in FIG. 2, when lens 11 is directed toward the sun, the sun's rays 18 are received as parallel rays aligned with the optical axis of the lens. The parallel rays pass through lens 11 and converge on the opposite side thereof at its focal point 19 which preferably lies on the surface of the spherical depression 13.

The surface of depression 13, as well as all other surfaces of cell 12 that are exposed to the sun, may be painted black to enhance their capability for absorbing the impinging rays of the sun. Solar energy is thus collected from the direct rays of the sun on the flat surfaces 21 surrounding the depression 13 as well as from rays 18 that pass through lens 11. When the position of the sun is directly above cell 12, a maximum amount of energy is collected at surface 21; at other times as in the early morning or later afternoon, the collected energy is limited for the most part to that collected by lens 11 which is instrumental in directing rays 18 of the sun to the surface of the depression 13.

The collected solar energy received by the surfaces 13 and 21 is carried by the thermally conductive metal of cell 12 to the water or other medium passing through or contained within pipes 14 and chambers 15.

As shown in FIGS. 3 and 4, the individual cells 12 may be bolted together to form an array 22 in which the pipes 14 are common to all of the cells 12 comprising the array 22 or the pipes of each cell may be interconnected in a series arrangement by suitable pipe connection means well known in the art. The water or other medium thus passes serially through the connected cells, collecting thermal energy from each cell.

A common sun sensor 23 and drive motor 24 are employed to actuate a rail 25 which is coupled to an extended pivot pin 17 of each of the several lenses 11. The coupling to each of the pivot pins 17 is by means of a control arm 26 which is rigidly secured at a right angle to the end of pivot pin 17. The outer ends of the individual control arms 26 are pivotally connected to rail 25 so that as rail 25 is moved in directions 27, the lenses 11 are rotated about their axes as defined by pivot pins 17. Thus, through the utilization of sensor 23 and motor 24 which is coupled to rail 25 through a gear mechanism 28, the several lenses 11 are caused to track the course of the sun across the sky.

To facilitate the mechanical assembly of cells 12 in an array 22, perpendicularly extending flanges 29 may be provided at the edges of cells 12. Bolts 30 are passed through aligned holes in flanges 29 to secure the individual cells 12 together. Alternatively, the array 24 may have several cells 12 cast and machined as a single block rather than individual cells connected together in the manner shown.

As indicated earlier, the energy collected by means of lens 11 is supplemented by energy collected directly from the sun at surface 21. To maximize the energy collected at surface 21, externally mounted concentrating mirrors 31 may be employed as shown in FIG. 6. In such an arrangement, the rays 18 from the sun 32 are reflected by mirrors 31 to the surface 21 of the solar collector cell 10. The intensity of the sun's rays at surface 21 is significantly increased in this manner.

In a similar fashion, a flat mirror 33 may be employed to extend the capability of lens 11 to lower angles of the sun for which the focal point of lens 11 would not otherwise strike the surface 13. A flat mirror is needed in this case to maintain the parallel pattern of the sun's rays directed to lens 11.

It will be recognized that an improved sun-tracking solar collector has been provided which through its lens system is in constant focal communication with the sun's rays as the sun moves across the sky during the course of the day in accordance with the stated objects of the invention. The only moving element of the collector is lens 11 which receives and redirects the rays of the sun to the storage cell 12. A highly compact and inexpensive tracking system is thus provided that requires no flexible or rotating fluid couplings. Further, the claimed cell configuration can be built up to any size array to fit given energy requirements by a predetermined combination of the cell disclosed.

Although but a single embodiment of the invention has been illustrated and described, it will be apparent to those skilled in the art that various changes and modifications may be made therein without departing from the spirit of the invention or from the scope of the appended claims.

What is claimed is:

1. A solar energy collector comprising:
   a block of heat absorbing material,
   a lens pivotally mounted on a surface of said block for receiving the rays of the sun,
   an indentation comprising a spherical configuration formed in said surface of said block juxtapositioned to said lens,
   said indentation providing clearance for the lens as it is pivoted about its mounting axis, and
   at least one fluid conducting passageway traversing said block for causing the fluid passing therethrough to absorb the heat of said block.

2. The solar energy collector set forth in claim 1 wherein:
   said passageway interiorly of said block is enlarged.

3. The solar energy collector set forth in claim 1 wherein:
   said passageway comprises a plurality of pipes extending unidirectionally through said block.

4. The solar energy collector set forth in claim 1 in further combination with:
   means for pivotally rotating said lens to follow the sun.

5. The solar energy collector set forth in claim 3 wherein:
   said means comprises a sun tracking mechanism.

6. The solar energy collector set forth in claim 1 in further combination with:
   a second block of heat absorbing material,
   a second lens pivotally mounted on a surface of said second block for receiving the rays of the sun,
   a second indentation in the surface of said second block juxtapositioned to said second lens,
   said second indentation providing clearance for said second lens as it is pivoted about its mounting axis,
   a second fluid conducting passageway traversing said second block, and
   means for connecting in series the passageways of the first and second blocks to form an array.

7. The solar energy collector set forth in claim 6 in further combination with:
   means for fastening the first and second blocks together in a unitary structure.

8. The solar energy collector set forth in claim 6 in further combination with:
   means for connecting both lens of the blocks together, and
   a sun tracking means connected to said means for causing the lens of both blocks to follow in unison the movement of the sun.

9. The solar energy collector set forth in claim 1 in further combination with:
   a further plurality of blocks of heat absorbing material,
   a plurality of lenses one for each of said plurality of blocks,
   each of said plurality of lenses being pivotally mounted on a surface of the associated block for receiving the rays of the sun,
   a plurality of indentations one formed in the surface of each of said blocks juxtapositioned to the associated lens,
   said indentations provide clearances for said plurality of lenses as they pivot about their mounting axes,
   a plurality of additional passageways traversing each of said blocks,
   means for connecting said passageway of said first block and said passageways of said plurality of blocks in series,
   means for fastening said block and blocks together in a unitary structure, and
   means for connecting said lens and lenses together, and
   a sun tracking means connected to said means for causing the lens of both blocks to follow in unison the movement of the sun.

10. The solar energy collector set forth in claim 1 wherein:
    said block is provided with a plurality of additional lenses,
    further additional indentations one formed in said block juxtapositioned to each of said plurality of lenses, and
    means for pivotally rotating in unison all of the lenses for tracking the sun.

* * * * *